US012105957B2

(12) United States Patent
Kalamatianos et al.

(10) Patent No.: US 12,105,957 B2
(45) Date of Patent: Oct. 1, 2024

(54) ACCELERATING RELAXED REMOTE ATOMICS ON MULTIPLE WRITER OPERATIONS

(71) Applicant: Advanced Micro Devices, Inc., Santa Clara, CA (US)

(72) Inventors: John Kalamatianos, Arlington, MA (US); Karthik Ramu Sangaiah, Seattle, WA (US); Anthony Thomas Gutierrez, Seattle, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 110 days.

(21) Appl. No.: 18/087,964

(22) Filed: Dec. 23, 2022

(65) Prior Publication Data

US 2024/0211134 A1    Jun. 27, 2024

(51) Int. Cl.
*G06F 12/00* (2006.01)
*G06F 3/06* (2006.01)

(52) U.S. Cl.
CPC ............ *G06F 3/061* (2013.01); *G06F 3/0656* (2013.01); *G06F 3/0659* (2013.01); *G06F 3/0673* (2013.01)

(58) Field of Classification Search
CPC ...... G06F 3/061; G06F 3/0656; G06F 3/0659; G06F 3/0673
USPC ........................................................ 711/105
See application file for complete search history.

(56) References Cited

U.S. PATENT DOCUMENTS

| 4,128,880 | A | 12/1978 | Cray, Jr. |
| 5,161,247 | A | 11/1992 | Murakami et al. |
| 5,241,492 | A | 8/1993 | Girardeau, Jr. |
| 5,742,840 | A | 4/1998 | Hansen et al. |
| 5,752,001 | A | 5/1998 | Dulong |
| 10,437,637 | B1 * | 10/2019 | Koneru ............... G06F 8/44 |
| 2021/0117249 | A1 * | 4/2021 | Doshi ............. H04L 67/1001 |
| 2023/0229630 | A1 * | 7/2023 | Soha ............... H03M 7/6052 |
| | | | 707/693 |

OTHER PUBLICATIONS

William M. Johnson; "Super-Scalar Processor Design"; technical paper; Technical Report No. CSL-TR-89-383; Computer Systems Laboratory, Departments of Electrical Engineering and Computer Science, Stanford University, Stanford, CA 94305-4055, United States; Jun. 1989; 146 pages.

(Continued)

*Primary Examiner* — Mardochee Chery
(74) *Attorney, Agent, or Firm* — Polansky & Associates, P.L.L.C.; Paul J. Polansky; Nathan H. Calvert

(57) ABSTRACT

A memory controller includes an arbiter, a vector arithmetic logic unit (VALU), a read buffer and a write buffer both coupled to the VALU, and an atomic memory operation scheduler. The VALU performs scattered atomic memory operations on arrays of data elements responsive to selected memory access commands. The atomic memory operation scheduler is for scheduling atomic memory operations at the VALU; identifying a plurality of scattered atomic memory operations with commutative and associative properties, the plurality of scattered atomic memory operations on at least one element of an array of data elements associated with an address; and commanding the VALU to perform the plurality of scattered atomic memory operations.

20 Claims, 4 Drawing Sheets

(56) References Cited

OTHER PUBLICATIONS

Motorola; Second Generation RISC Microprocessor; technical paper; User Manual: MC88110; 500 W Monroe Street, Ste 4400 Chicago, IL 60661-3781, United States; 1991; 179 pages.

Motorola; MPC7410/MPC7400 RISC Microprocessor; technical paper; User Manual; 500 W Monroe Street, Ste 4400 Chicago, IL 60661-3781, United States; MPC7410UM/D, Rev. 1; Nov. 2002; 696 pages.

Matthew D. Sinclair, Johnathan Alsop and Sarita V. Adve; "Chasing Away Rats: Semantics and Evaluation for Relaxed Atomics on Heterogeneous Systems"; white paper; University of Illinois at Urbana-Champaign; ISCA 2017; Toronto, ON, Canada; Jun. 24-28, 2017; 14 pages.

Yongzhe Zhang, Ariful Azad and Zhenjiang Hu; "FASTSV: a Distributed-Memory Connected Component Algorithm With Fast Convergence"; white paper; 2020; 12 pages.

Ariful Azad and Aydin Buluc; "LACC: a Linear-Algebraic Algorithm for Finding Connected Components in Distributed Memory"; white paper; 2019 IEEE International Parallel and Distributed Processing Symposium; Rio de Janeiro, Brazil; May 20-24, 2019; 11 pages.

Leonardo Dagum and Ramesh Menon; "Open MP: an Industry Standard API for Shared-Memory Programming"; white paper; IEEE Computationaslc IENCE & Engineering; Jan.-Mar. 1998 issue; 10 pages.

Rajeev Thakur, Rolf Rabenseifner and William Gropp; Optimization of Collective Communication Operations in MPICH; white paper; 17 pages.

Jung Ho Ahn, Mattan Erez and William J. Dally; "Scatter-Add in Data Parallel Architechures"; white baper; Computer Systems Laboratory, Stanford University, Stanford, CA 94305, United States; 11th Int'l Symposium on High-Performance Computer Architecture; Feb. 12-16, 2005; San Francisco, CA, USA; 11 pages.

Siddhartha Sahu, Amine Mhedhbi, Semih Salihoglu, Jimmy Lin and M. Tamer Özsu; "The Ubiquity of Large Graphs and Surprising Challenges of Graph Processing"; white paper; David R. Cheriton School of Computer Science University of Waterloo, 200 University Ave W, Waterloo ON Canada, N2L 3G1; 12 pages.

* cited by examiner

ACCELERATING RELAXED REMOTE ATOMICS ON MULTIPLE WRITER OPERATIONS

STATEMENT REGARDING FEDERALLY SPONSORED RESEARCH OR DEVELOPMENT

This invention was made with Government support under Contract No. H98230-22-C-0152 awarded by the Department of Defense. The Government has certain rights in this invention.

BACKGROUND

A system-on-chip (SOC) combines data processors such as central processing unit (CPU) cores and graphics processing unit (GPU) cores with peripheral controllers and memory interfaces on single integrated circuit chip. For example, an SOC could incorporate a display controller, an image signal processor (ISP), and other peripheral controllers on the SOC to enable the input and output of information. As another example, a GPU processing system or machine intelligence (MI) processing system can include multiple computing core complexes which all access a memory in parallel. In such multi-node SOCs, the computing cores typically transfer data between resources such as memory by routing accesses through common resources such as a large, on-chip routing circuit or "data fabric".

When multiple computing threads attempt to perform an operation in a data structure in parallel, updates to elements of the data structure often need to be synchronized across threads. This need leads to high overhead due to typically long latencies in synchronizing multiple threads in multicore SoCs, for both CPUs and GPUs. For example, the Weakly Connected Components (CC) graph algorithm is a popular graph workload amongst graph computing practitioners. The CC algorithmically requires a "min-store" operation to iteratively converge graph vertex identifiers (IDs) into connected component IDs. This key operation is traditionally implemented with irregular all-to-all communication that can become the bottleneck for the system scalability.

Figure 1:
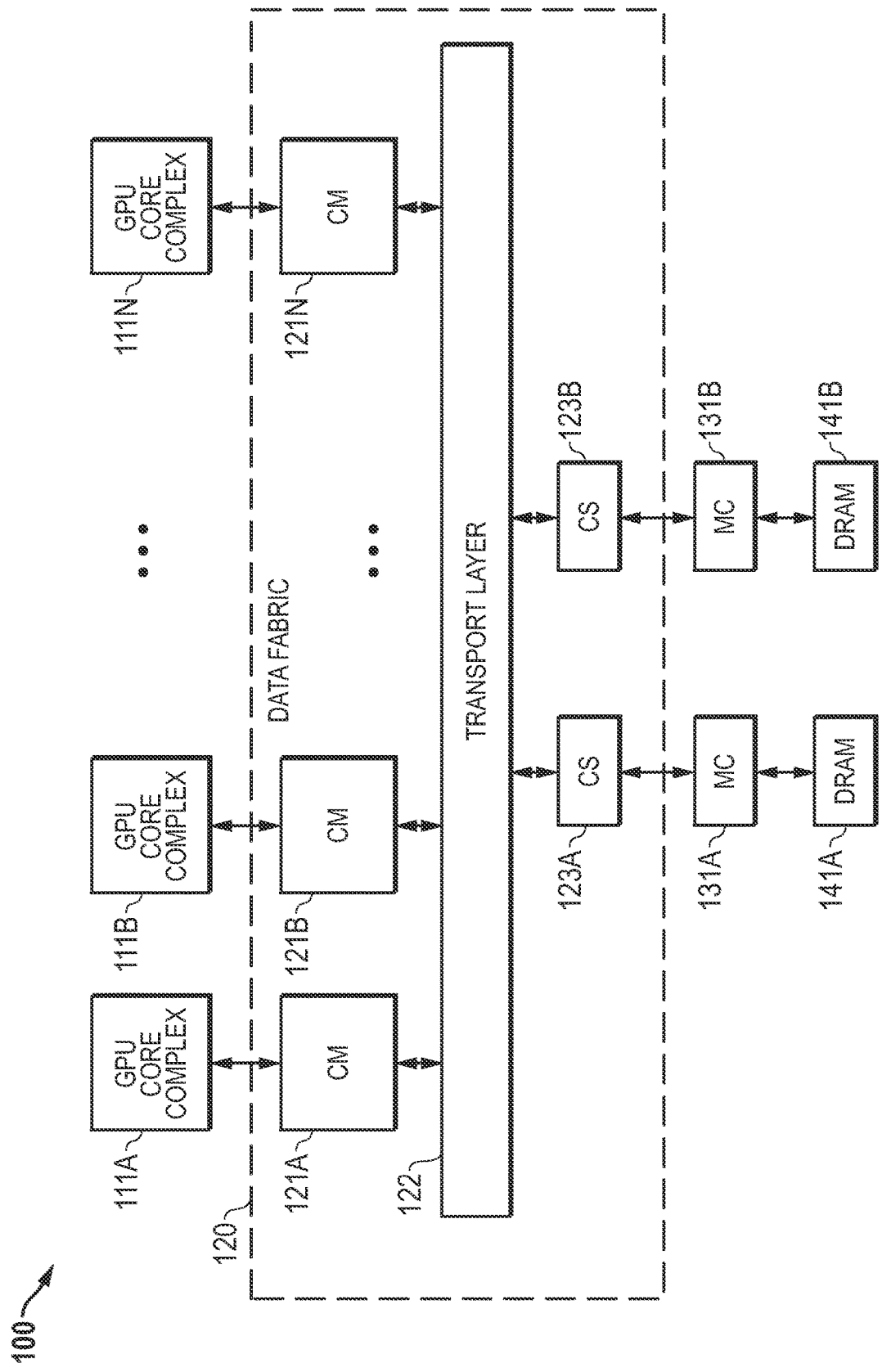
FIG. 1 illustrates block diagram form a data processing system according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A memory controller includes a command queue, an arbiter, a vector arithmetic logic unit (VALU), a read buffer and a write buffer both coupled to the VALU, and an atomic memory operation scheduler. The command queue that holds memory access commands and respective associated addresses. The arbiter picks memory access commands from the command queue for dispatch to a random-access memory (RAM). The VALU performs scattered atomic memory operations on arrays of data elements responsive to selected memory access commands. The atomic memory operation scheduler schedules operations at the VALU, and includes an input coupled to the command queue for identifying a plurality of scattered atomic memory operations including commutative and associative properties and operating on at least one element of an array associated with an address, and an output for commanding the VALU to perform the plurality of operations using data retrieved once from the RAM.

A method is provided for accelerating atomic memory operations at a memory controller. The method includes, from a command queue at the memory controller, a plurality of scattered atomic memory operations with commutative and associative properties and operating on at least one element of an array of data elements associated with an address. The method retrieves a data array associated with the plurality of scattered atomic memory operations from a random-access memory and storing it in a read buffer entry. The method includes commanding a VALU to perform a first one of the plurality of scattered atomic memory operations and storing a resulting data array in the write buffer entry. The method includes commanding the VALU to perform a subsequent one of the plurality of scattered atomic memory operations and storing a resulting data array in the write buffer entry.

A data processing system includes a data processor, a RAM coupled to the data processor, and a memory controller. The memory controller includes a command queue, an arbiter, a vector arithmetic logic unit (VALU), a read buffer and a write buffer both coupled to the VALU, and an atomic memory operation scheduler. The command queue that holds memory access commands and respective associated addresses. The arbiter picks memory access commands from the command queue for dispatch to the RAM. The VALU performs scattered atomic memory operations on arrays of data elements responsive to selected memory access commands. The atomic memory operation scheduler schedules operations at the VALU, and includes an input coupled to the command queue for identifying a plurality of scattered atomic memory operations including commutative and associative properties and operating on at least one element of an array associated with an address, and an output for commanding the VALU to perform the plurality of operations using data retrieved once from the RAM.

One existing approach to making updates to synchronized elements of the data structure across threads proposes a synchronization free version of a vectorized variant of the typical fetch-and-add synchronization operation, referred to as a "scatter-add" operation. The scatter-add operation updates random array elements by either a constant or by the element of a second array. Such an operation is useful for histogram updates in data analytics applications such as MapReduce, for reductions in matrix multiplications, and for supporting a superposition operator which arises naturally in many physical scientific applications. The approach introduces a hardware adder and a mini-cache like structure with a store buffer that tracks address, value pairs in a dedicated queue of the memory controller. The scatter-add functionality is supported by content-addressable memory (CAM) accesses to the queue using the address, value pairs. An addition operation is scheduled serially for each element of the array being updated. The process avoids frequent updates in memory by keeping the updated data in the store buffer until the operation is complete.

In another approach, different types of relaxed atomics typically required to accelerate heterogeneous systems under sequential consistency are classified. These are referred to as "Commutative Atomics". This approach uses a cache-centric architecture and focuses on commutative operations.

FIG. 1 illustrates in block diagram form a data processing system 100 according to some embodiments. Data processing system 100 generally includes multiple GPU core complexes 111A-N, a data fabric 120, multiple memory controllers ("MC") 131A-B, and multiple memory devices 141A-B, which in this embodiment are dynamic random-access memory (DRAM devices). Many other components of an actual data processing system are typically present but are not relevant to understanding the present disclosure and are not shown in FIG. 1 for ease of illustration.

GPU core complexes 111A-N each include a set of GPU cores, each of which is bidirectionally connected to data fabric 120. Each GPU core may be a unitary core only sharing a last-level cache with the other GPU cores, or may be combined with some but not all of the other cores in clusters. While multiple GPU core complexes 111 A-N are depicted, other types of processors (not shown) are also typically connected to data fabric 120 as clients, such as CPU cores and display controllers.

Data fabric 120 includes a set of coherent master controllers 121A-N each labeled "CM", a set of coherent slave controllers 123A-B each labeled "CS" interconnected by and through a fabric transport layer 122. As used herein, a coherent master controller is considered to be a master port because it can be connected to memory accessing agents that are capable of initiating memory access requests, regardless of whether the memory access requests are read or write accesses. Likewise, a coherent slave controller is considered to be a slave port because it connects to memory access responders such as memory controllers 131A-B that are capable of responding to memory access requests, regardless of whether the memory access requests are read or write accesses.

Fabric transport layer 122 includes a crossbar router or series of switches for routing memory-mapped access requests and responses between its ports. Data fabric 120 also includes a system memory map, typically defined by a basic input/output system (BIOS), for determining destinations of memory accesses based on the system configuration. Data fabric 120 is includes a coherent master controller for each attached memory accessing agent. Each coherent master controller 121A-N has a bidirectional upstream port, a bidirectional downstream port, and a control input, as well as its own internal buffering for both accesses received from a client and responses received from a coherent slave through fabric transport layer 122. Each coherent master controller 121 also has a control interface connected to its upstream port to provide backpressure signaling to corresponding memory accessing agents to avoid overrunning its limited buffer space. Data fabric 120 is likewise constructed to have a coherent slave controller 123 for each of memory controllers 131. Each coherent slave controller 123A-B has buffering that allows memory access requests to be stored before or after being processed through fabric transport layer 122, depending the direction.

Each of memory controllers 131A-B has an upstream port connected to data fabric 120 through a corresponding coherent slave controller 123, and a downstream port connected to a corresponding memory device over a physical layer interface (PHY) such as a graphics double data rate (GDDR) PHY or PHY for a disaggregated memory module such as a high-bandwidth memory (HBM) module over a Peripheral Component Interface Express (PCIe) link. Memory devices 141A-B are preferably dynamic random-access memory (DRAM), such as double data rate 5 (DDR5) DRAM, or disaggregated memory modules such as HBM modules.

Data processing system 100 is a highly integrated, high-performance digital data processor that performs many of the functions associated with a workstation, a server, or the like. In operation, data processing system 100 implements a unified memory space in which all memory in the system is potentially visible to each memory accessing agent such as GPU core complexes 111A-N. Data fabric 120 is the medium by which accesses initiated by a memory accessing agent are provided to a memory accessing responder, and a response from a memory accessing responder is returned to the initiating memory accessing agent. Data fabric 120 uses a central fabric transport layer 122 to multiplex the accesses and responses between the corresponding master and slave controllers based on a system address map. The general operation of memory accessing agents such as coherent master controllers 121 is conventional and well known in the art and will not be described further. Likewise, the general operation of memory accessing responders is well known and is typically specified by a published standards, such as one or more of the double data rate (DDR) synchronous dynamic random-access memory (SDRAM) and HBM standards published by the Joint Electron Devices Engineering Council (JEDEC), and will not be described further except as concerning the features introduced herein.

Figure 2:
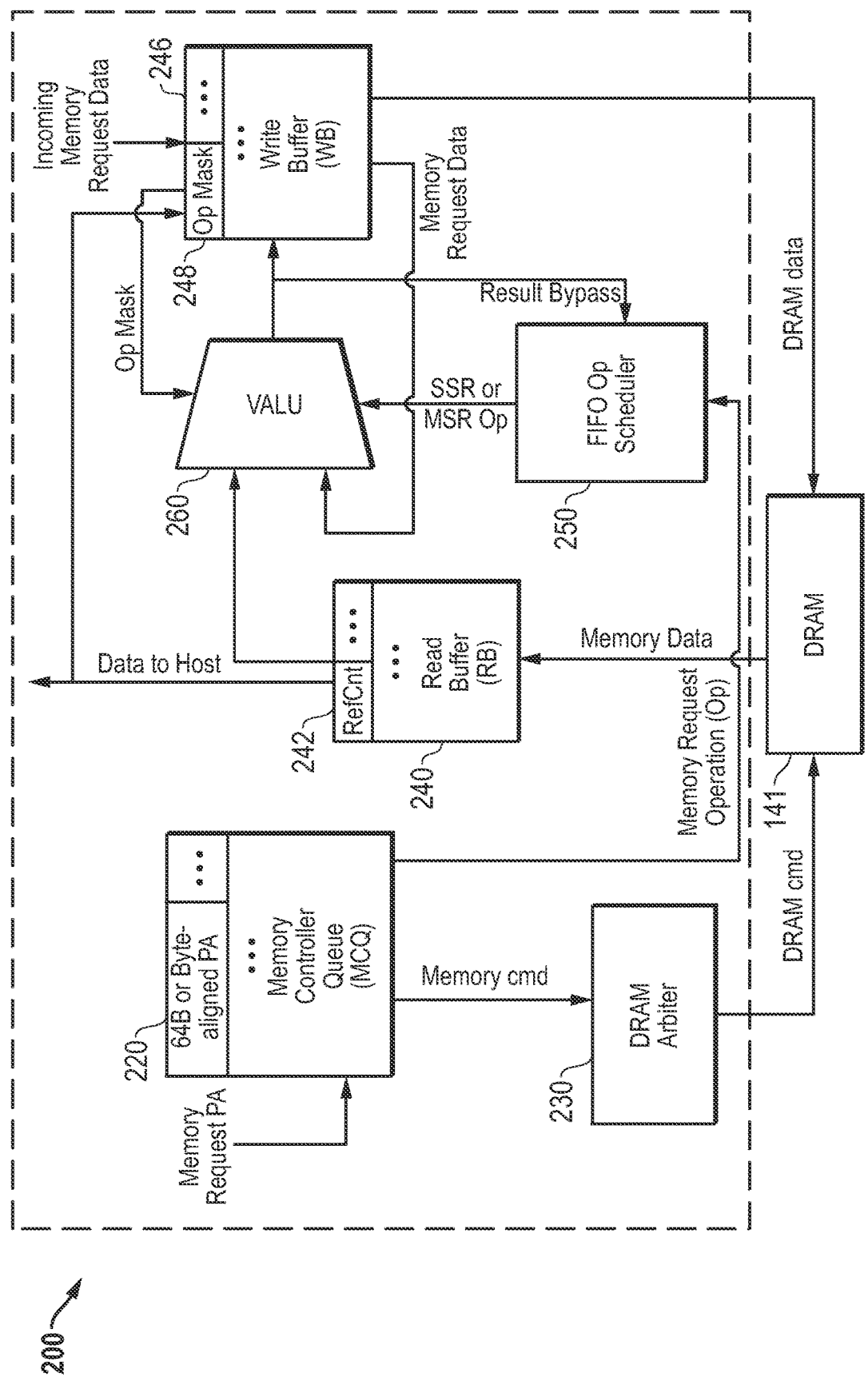
FIG. 2 illustrates in block diagram form portion of a data processing system including a memory controller according to some embodiments.

FIG. 2 illustrates in block diagram form portion of a data processing system including a memory controller 200 suitable for implementing any one of memory controllers 131A-B of FIG. 1 according to some embodiments. Memory controller 200 generally schedules and dispatches memory commands to DRAM 141, and includes a memory controller queue (MCQ) 220, an arbiter 230, a read buffer 240, a write buffer 246, a first-in-first-out operation scheduler ("FIFO Op Scheduler") 250, and a vector arithmetic logic unit (VALU) 260. In various implementations, memory controller 200 also includes other elements such as address decoders, page tables, timing blocks, error correction code (ECC) generation and checking, and refresh control logic, which are not shown here to avoid obscuring the relevant portions.

MCQ 220 is a queue of memory access requests received from the memory accessing agents in data processing system 100. MCQ 220 has an input labeled "Memory Request PA" for receiving memory access requests over an interface from data fabric 120, are fed to MCQ 220 including a physical address (PA) associated with memory access request. MCQ 220 has a number of entries each storing an operation code ("Opcode") for the memory access command, a PA that may be 64 B-aligned or byte-aligned (decoded by an address decoder), as well other information that allows memory controller 200 to select memory accesses efficiently, such as access type and quality of service (QoS) identifiers. Entries of MCQ 220 may be arranged in entry stacks.

Arbiter 230 is bidirectionally connected to MCQ 220, and generally performs intelligent scheduling of accesses to improve the usage of the memory interface to DRAM 141. Arbiter 230 includes a single command input for each entry or entry stack of MCQ 220, and selects commands therefrom to schedule for dispatch to the DRAM channel. While a DRAM is shown in this embodiment, other types of RAM are used in other embodiments.

FIFO Op Scheduler 250 has a bidirectional connection to MCQ 220, an output connected to VALU 260 labeled "SSR or MSR Op" for scheduling single step reduction (SSR) or multiple step reduction (MSR) type operations, and an input connected to VALU labeled "Result Bypass" for receiving bypass results. FIFO Op Scheduler 250 generally includes digital logic for recognizing certain types of memory access commands in MCQ 220 and scheduling them for execution by VALU 260, as further described below.

Read buffer 240 has an input labeled "Memory Data" connected to the downstream port of the DRAM interface for receiving read data from DRAM 141, an output labeled "Data to Host" connected to the upstream port to data fabric 120, an output connected to VALU 260, and a bidirectional connection (not shown separately) to FIFO Op Scheduler 250 for performing searches for related memory operations as further described below. Read buffer 240 generally includes a number of entries, in this embodiment each 64 B wide, for holding data read from memory, which may be passed on to the host or fed to VALU 260 for performing operations. Each entry of read buffer 240 includes a reference counter "RefCnt" for tracking a number of related memory operation which will operate on data for the PA of the read buffer buffer entry.

Write buffer 246 has an input connected to the upstream port to data fabric 120 labeled "Incoming Memory Request Data" for receiving write data associated with memory access commands, an output labeled "DRAM data" connected to the downstream port for the DRAM interface to DRAM 141, an input connected to read buffer 240 for receiving operand data, an output connected to VALU 260 labeled "Op Mask" for feeding operation mask data to VALU 260, an output connected to VALU 260 labeled "Memory Request Data", and a bidirectional connection to FIFO Op Scheduler 250 (not shown separately) for managing Op Mask values as further described below. Write buffer 246 includes a number of entries, in this embodiment each 64 B wide, for holding write data, which may serve as intermediate operand data when executing some commands, as further described below. Each entry includes an operation mask (Op Mask) 248 including a number of bits equal to the maximum number of data elements of the vector data for operations to be performed by VALU 260, as further described below.

VALU 260 has an input connected to read buffer 240, a Memory Request Data input connected to write buffer 246, an Op Mask input connected to write buffer 246, a SSR or MSR Op input connected to FIFO Op Scheduler 250, and an output connected to write buffer 246 and to the Result Bypass input of FIFO Op Scheduler 250. In this embodiment, VALU 260 is a vector ALU executing two types of vector operations with a designated operand bit-length such as 512-bit. The first type of operation uses two input vector operands, each operand is formatted as a N×M-bit operand where M is the precision of each data element and N is the number of data elements per vector operand. The operation is pair-wise and generates N×M-bit results. Masking is supported using the Op Mask values from write buffer 246. This first type of operation is referred to herein as a Single Step Reduction operation (SSR). The second type of operations has one input vector operand. The operand is formatted as a N×M-bit operation where VALU 260 performs the same operation on the N data elements in a pipelined manner to generate one M-bit result. This second type of operation is referred to herein as a Multiple Step Reduction operation (MSR). For MSR operations, masking is also supported using the Op Mask values from write buffer 246. Preferably, VALU 260 is fully pipelined so it can support SSR or MSR operations in the presence of an ongoing MSR and sustain a peak throughput of one operation (SSR or MSR) per clock. For example, log N pipe stages may be used assuming a binary tree data flow graph, even though other suitable designs may also be used.

In operation, memory controller 200 handles a normal set of DRAM access commands, including generally read and write commands, for data processing system 100, and also supports memory centric execution of a set of vector operation commands, from various memory accessing agents, for performing multiple updates to a shared data structure or variable in a synchronization free manner using relaxed, remote atomics. To allow for such synchronization free operation, memory controller 200 accelerates certain vector operation commands that are both commutative and associative. Generally, the operations are referred to as scatter operations or "Scatter-op" type operations in that they allow for updating of a random array random array elements by either a constant or by the element of a second array. The hardware support performs these operations using memory centric requests received at MCQ 220 and identified by their request Opcode.

FIFO Op Scheduler 250 controls VALU 260 for performing groups of Scatter-op type operations with commutative and associative operation such as max, min, sum, multiply, logical operations, etc. using remote, relaxed atomics via memory centric requests. Operand data is held in read buffer 240 and write buffer 246 for coordinating multiple related operations. In this embodiment, typical operations have the following form:

$$A[i] = A[i] + \mathrm{Sum}(B[0 \to N]),$$

$$A[i] = \max(A[i], B[0 \to N]),$$

$$A[i] = \min(A[i], B[0 - :> N]),$$

$$A[i] = A[i] \cdot \mathit{Prod}(B[0 - :> N)].$$

$$A[i] = \mathit{LogicalOp}(A[i], B[O - : > N])), \text{ etc.}$$

A[i] and B[i] are data elements of vectors A and B. The precision width of the data elements depends on the application (e.g. 32-bit, 64-bit, 16-bit. etc.). The data elements can be either values stored in main memory or values calculated by the hosts. The Scatter-op operations can be supported by relaxed atomics using the techniques and processes herein since the order between them does not matter in that operations are combined that are both commutative and associative. Associative as used herein means a op (b op c)=(a op b) op c, and commutative means that a op b=b op a.

Memory centric execution of Scatter-op operations is especially beneficial for applications with high data reuse distance Scatter-op type computations, for example, very large memory footprint double-precision general matrix multiplication (DGEMM), sparse matrix-vector multiplication (SpMV) or general sparse matrix-matrix multiplication (SpGEMM) kernels. Such applications generally have severe limitations in scaling of on-package caching to contain all the data until the data are reused. Furthermore, on-package caching may not be beneficial because it requires expensive all-to-all communications in which Scatter-ops to the same memory location are either spread across multiple private caches or are performed on a highly congested shared cache. Memory centric operations as described herein can also be beneficial especially for high bandwidth memories (e.g. HBM) where the large number of memory channels (and memory controllers) can be used to provide parallelism for Scatter-op traffic.

As described below, memory controller 200 operates to provide for safe reordering of selected Scatter-op operations (from a memory consistency perspective) in that (i) racing updates in the execution of scatter ops are commutative and give the same result regardless of their order of execution, (ii) the values they load are not consumed elsewhere, and (iii) the final calculated value is loaded only after another paired synchronization interaction (e.g. a barrier).

In fulfilling normal memory access requests, memory controller 200 includes circuitry that allows it to pick memory accesses for dispatch to the associated memory channel. For normal memory access requests, read buffer 240 and write buffer 246 hold read and write data for forwarding to and from the memory, respectively. Arbiter 230 uses decoded address information, timing eligibility information, and active page information to efficiently schedule memory accesses while observing other criteria such as quality of service (QoS) requirements. For example, arbiter 230 implements a preference for accesses to open pages to avoid the overhead of precharge and activation commands required to change memory pages, and hides overhead accesses to one bank by interleaving them with read and write accesses to another bank. In particular during normal operation, arbiter 230 normally keeps pages open in different banks until they are required to be precharged prior to selecting a different page.

In fulfilling Scatter-op type memory requests, FIFO Op Scheduler 250 is used to support remote atomic operations by recognizing operations that can be grouped together for more efficient memory access, creating and scheduling memory access commands to implement the Scatter-op requests, and coordinating the interaction of VALU 260 with read buffer 240 and write buffer 246 to accumulate operand data and perform the Scatter-op type operations. FIFO Op Scheduler 250 also manages latency of requests using a programmable threshold value indicating how many Scatter-op type requests should be accumulated and grouped before issuing an operation to VALU 260.

Write buffer 246 is able to hold data for both conventional memory writes and Scatter-op requests. Write buffer 246 can be written at the data element precision width granularity. For example, if the data elements are 16-bit wide, then the write buffer entry can be written at a 16-bit granularity. Similar fine-grain read/write operations are supported by read buffer 240, which holds the data arriving from memory for both conventional memory reads and Scatter-op requests. Each read buffer entry is augmented with a reference counter RefCnt 242 which tracks the number MCQ 220 entries holding Scatter-op requests associated with the same PA as that used to populate the read buffer entry from DRAM.

In this embodiment, FIFO Op Scheduler 250 picks operations, generated by the memory controller, in a FIFO fashion. FIFO Op Scheduler generally checks new Scatter-op requests arriving in MCQ 220 to identify scattered atomic memory operations including commutative and associative properties operating on at least one element of an array of data elements associated with an address. When new commands are found directed to the same PA as one or more prior existing commands for which data has already been retrieved from memory and is present in read buffer 240, FIFO Op Scheduler 250 schedules the new commands for execution at VALU 260, thus performing a number of operations using data retrieved only once from DRAM 141. FIFO Op Scheduler 250 recognizes whether operations are SSR or MSR operations, and is able to update the Op Mask value for the appropriate entry in write buffer 246 to perform multiple related operations.

As discussed above, each entry of write buffer 246 includes an Op Mask 248 with a bit length equal to the max number of data elements in the write buffer entry. For a write buffer entry supporting a SSR operation, the Op Mask bit at position x is set if the Scatter-op updates the xth M-bit data element of a 64 B-aligned Physical Address (PA). Otherwise, the Op Mask bit is set to 0. For a write buffer entry supporting a MSR operation, Op Mask bit values are updated based on the Op Mask bit values in a new Scatter-op request. For simplicity these values are stored sequentially inside the write buffer entry. The order by which they apply does not matter. In both cases, the Op Mask bits drive the masking for each operation performed by VALU 260.

In support of SSR operations, memory controller 200 stores data from the same 64 B line in each write buffer entry. The physical addresses stored in the corresponding MCQ entries are 64 B-aligned. In support of MSR operations, memory controller 200 reserves separate write buffer entries where it stores the different values to be combined in a reduction operation for a particular data element. Each such write buffer entry has a corresponding read buffer entry identified by the same byte-aligned physical address used by the Scatter-op request. When a new Scatter-op arrives at MCQ 220 with a physical address for which no data has been loaded in read buffer 240, MCQ 220 reserves entries assuming each Scatter-op request will be completed using SSR operations. MCQ and write buffer entries track SSR Scatter-op operations within the 64 B line boundary. The write buffer serves as a coalescing buffer for SSR Scatter-op operations. Memory controller 200 reserves a new MCQ and write buffer entry for SSR operations only when it detects a second value for a data element within the 64 B line boundary, tracked by one of the existing MCQ entries. In this case, the first value of the data element remains in the original write buffer entry and is not copied to the new write buffer entry. This process does not break functional correctness because the Scatter-op operations are commutative and associative. MSR operations are tracked by byte-aligned physical addresses, and SSR operations by 64 B-aligned physical addresses. By using a Content Addressable Memory (CAM) that checks for physical address matches at the byte offset, memory controller 200 can differentiate between MCQ entries that can trigger SSR and MSR operations for data elements within the same 64 B line.

Each Scatter-op memory request for a physical address value of X is identified by its unique Opcode and the data value that will be an operand in the computation for a specific data element. Implementing the Scatter-op generally includes two basic operations: res=op(value, memory[X]) and res→memory[X]. That is, performing the desired operation on the data from address X, and storing the result to the memory at address X. Besides the use of Opcode values that distinguish a Scatter-op from conventional writes performed at memory controller 200, all other fields for the supported Scatter-ops are typically provided by a conventional memory write request format. However, the physical address is not 64 B-aligned as in typical memory writes. Instead, it is byte-aligned to indicate the position of the data element that needs to be updated.

Figure 3:
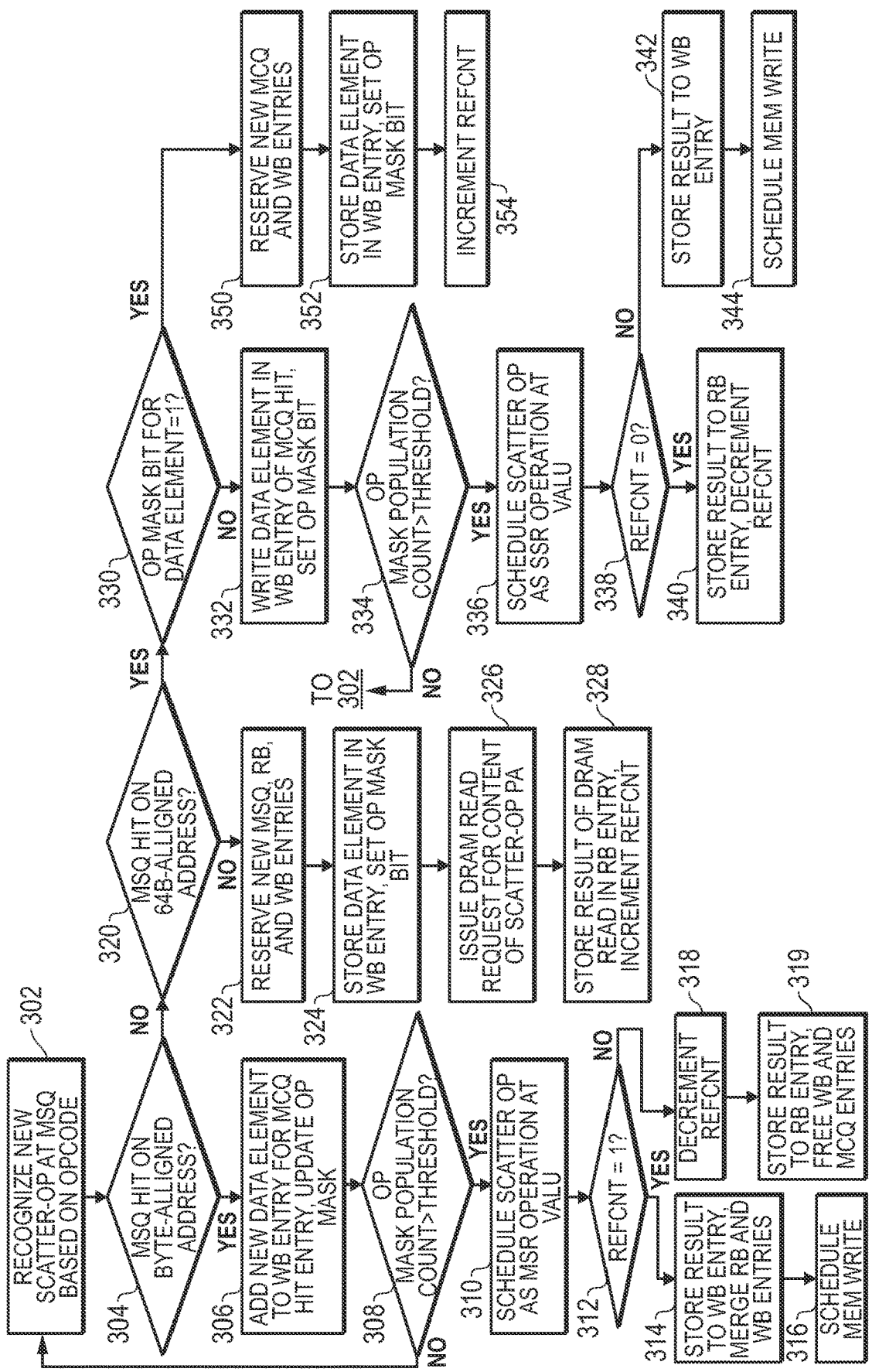
FIG. 3 shows a flowchart of a process for performing memory centric execution of operations according to some embodiments.

FIG. 3 shows a flowchart 300 of a process for performing memory centric execution of operations according to some embodiments. The depicted process is suitable for implementation with a memory controller 200 (FIG. 2), or other memory controllers including a suitable VALU and FIFO Op Scheduler. In this implementation, the process is generally managed by FIFO Op Scheduler 250 in cooperation with the other circuits of memory controller 200.

When a Scatter-op request arrives MCQ 220, it is recognized by the Opcode of the request (block 302). After recognizing that a new scatter op has arrived, FIFO Op Scheduler 250 searches MCQ 220 with the request's byte-aligned physical address (block 304). The search looks for a hit with both the unmodified, byte-aligned, version of the physical address (block 304) and the 64 B-aligned version of the physical address (block 320). While two separate blocks are shown, preferably a single search is made using a CAM search of the MCQ, providing a result indicating whether a hit is byte aligned or 64 B-alligned. If there is a hit on the byte-aligned physical address, which indicates that there is at least one pending MSR Scatter-op targeting the same 64 B line already present, the process adds the new data element value in the write buffer entry corresponding to the MCQ entry that hit in the search (block 306). The process also updates the Op Mask bit of the write buffer entry corresponding to the byte-aligned location for the request. In this case, the write buffer entry stores multiple values for the same data element that need to be combined (MSR Scatter operation).

Then FIFO Op Scheduler 250 checks the Op Mask population count (block 308) to determine whether it is set to M=N−1 bits set or if M>T where T is a programmable threshold<N (N=total number of data elements per 64 B byte). If the Op Mask population count is not over the threshold, no further action is taken for this MSR Scatter-op request and FIFO Op Scheduler 250 waits for more requests without scheduling the Scatter-op command at VALU 260. If the Op Mask population count is over the threshold, then FIFO Op Scheduler 250 issues the Scatter-op as an MSR operation to VALU 260 (block 310). The MSR operation has one input operand at VALU 260. That is, the data element values in the write buffer entry are used to perform an MSR operation on the corresponding data value from the read buffer. It is noted that the process guarantees that a read buffer entry associated with the physical address is already present. The read buffer entry may contain DRAM data or the most up to date data for the target physical address based on past SSR and MSR operations to elements of that physical address.

FIFO Op Scheduler 250 checks the RefCnt of the associated read buffer entry before storing the result of the MSR operation (block 312). If RefCnt is 1 then there is no other MCQ entry that has pending data updates to the elements of the target physical address. In this case, FIFO Op Scheduler 250 writes back the result of the MSR operation to the write buffer entry, to the corresponding byte offset within the 64 B line, and merges the rest of the data from the read buffer entry into the write buffer entry (block 314). It also schedules a DRAM write command for the write buffer entry (block 316). When the scheduled DRAM write command is picked by arbiter 230, FIFO Op Schedulers 250 frees the corresponding write buffer, read buffer, and MCQ entries, resets the Op Mask, and decrements the RefCnt. If RefCnt is greater than 1 (at block 312), then the other MCQ entries with pending data updates to elements of the target physical address. In this case, FIFO Op Scheduler 250 decrements the RefCnt (block 318). It also frees the write buffer and MCQ entries and writes the result to the read buffer entry, at the corresponding byte offset (block 319).

If the MCQ search on the byte-aligned physical address for a new Scatter-op fails to find a matching entry, then FIFO Op Schedulers 250 checks for a hit on the 64 B-aligned physical address for the new Scatter-op (block 320). If there is a miss, indicating that there are no pending Scatter-ops for the target 64 B-alligned physical address, then FIFO Op Schedulers 250 reserves new MCQ, read buffer and write buffer entries (block 322). It stores the data element value in the write buffer entry, sets the corresponding Op Mask bit (block 324), and issues a DRAM read request to read the contents of 64 B-aligned target physical address of the Scatter-op (block 326). The memory data is stored in the reserved read buffer entry once the DRAM read completes (block 328). The corresponding read buffer entry's RefCnt 242 is incremented. No further action is taken at this point, and memory controller 200 does not perform the SSR operation for the data element values stored in the read buffer and write buffer entries. Instead, it waits until more data elements from the same 64 B line accumulate in the same write buffer entry.

If there is a hit with the 64 B-aligned physical address (at block 320), then FIFO Op Scheduler 250 checks the Op Mask bit (block 330) of the write buffer entry with same physical address. This action checks if the data element of the newly arrived Scatter-op request already has another data element value in the write buffer entry or not. If the Op Mask bit of the MCQ entry is 0, then the newly arrived data element value is written into the write buffer entry (thus coalescing the operand data) and the Op Mask bit is set to 1 (block 332). Then FIFO Op Scheduler 250 checks if the Op Mask population is M<N, M<T where T is a programmable threshold (block 334). If the Op Mask population is not over the threshold or at the maximum (either condition may be used in various embodiments), no further action is taken. However, if the resulting Op Mask population is M=N or M>T, then FIFO Op Scheduler 250 schedules the operation as an SSR operation to the FIFO scheduler (block 336). The operation uses two operands: the write buffer entry data element values and the read buffer data element values using the read buffer entry corresponding to the 64 B-aligned physical address in the MCQ. If an Op mask bit is 0 then the read buffer data is forwarded to the result by VALU 260. Upon executing the scheduled SSR operation, VALU 260 checks the RefCnt (block 338). If the RefCnt is greater than 0, then it stores the result to the read buffer, overwriting the old data, decrements the RefCnt and completes (block 340). The read buffer entry will hold the data that will participate in the remaining Scatter-ops with the same 64 B physical address that are present in the MCQ (as is indicated by RefCnt being greater than 0). If the RefCnt is 0 then the VALU 260 stores the results to the same write buffer entry (block 342) and schedules a DRAM write operation (block 344). It also frees the corresponding MCQ and read buffer entries, and clears the Op mask. The write buffer entry is freed upon completion of the DRAM write.

If the Op Mask bit of the MCQ entry is 1 (at block 330), then FIFO Op Scheduler 250 reserves a new MCQ and write buffer entry (block 350). It stores the new data element value in the write buffer entry. The newly reserved MCQ entry stores the byte-aligned physical address and its Op Mask bit is set to 1 (block 352). The offset of the data element does not matter for this type of write buffer entry because all the data values need to participate in the Scatter-op for the same data element. FIFO Op Scheduler 250 also increments the RefCnt of the read buffer entry corresponding to the 64 B-aligned physical address (block 354).

In some host implementations of relaxed, remote atomics, coalescing may be allowed for improved performance. This means that a Scatter-op request may hold values for multiple data elements in the same 64 B line. For such cases, memory controller 200 first tries to coalesce a newly arrived Scatter-op request with a MCQ entry that carries SSR operations (multiple data elements from same 64 B-aligned physical address). If coalescing is possible, the actions taken after that follow the process described above. If coalescing is not possible (in the case that the Op Mask of newly arrived Scatter-op request has data elements at the same offsets as the MCQ entry with the same 64 B-aligned physical address) then FIFO Op Scheduler 250 issues a SSR operation with the entry that has the largest Op Mask population (either the new Scatter-op or the existing write buffer entry). The SSR operation uses the read buffer entry as the second operand. The result is written into the read buffer entry and the entry with the smallest Op Mask population is stored in the existing write buffer entry, overwriting its contents. The Op Mask is modified accordingly while the RefCnt of the read buffer entry remains unchanged.

Figure 4:
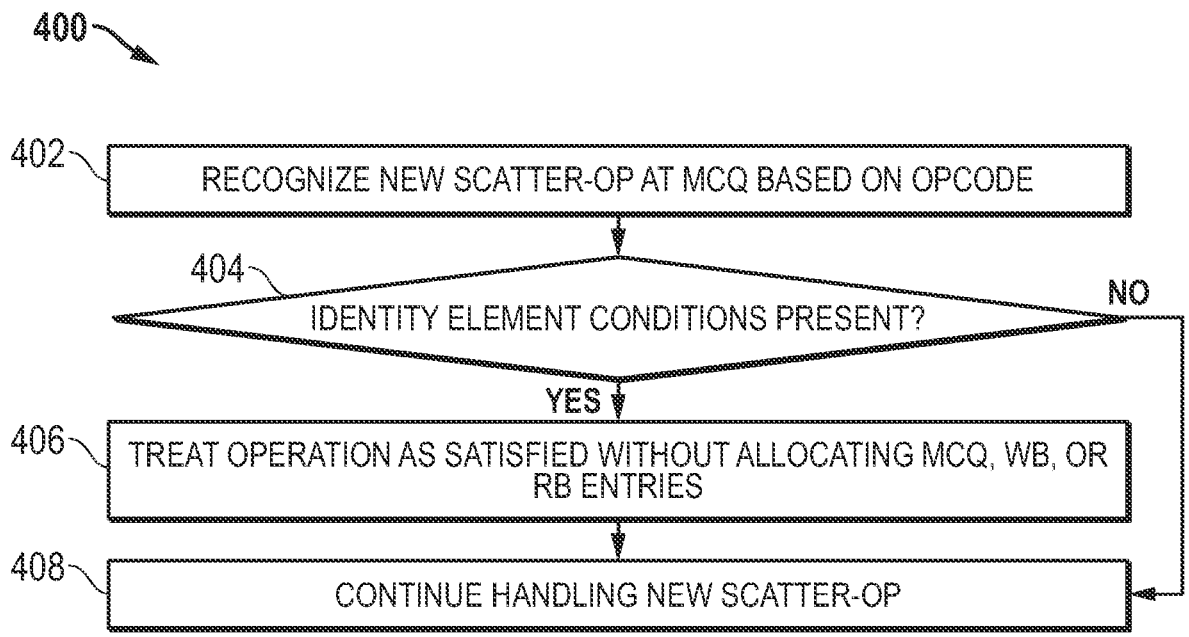
FIG. 4 shows a flowchart of a process for handling an identity condition for a remote atomic operation according to some embodiments.

FIG. 4 shows a flowchart 400 of a process for handling an identity condition for a remote atomic operation according to some embodiments. Because memory controller 200 is able to recognize and group associative and commutative commands, in some embodiments it is also able to support leverage properties of the commutative/associative operations when applied to their identity elements (e.g., 0 for + operations, 1 for × operations, MIN_VALU for max operations, etc.) When a new Scotter-op arrives at MCQ 220 and is recognized by its Opcode (block 402), FIFO Op Scheduler 250 checks a separate set of comparators stored at memory controller 200 to check values against the identity elements for incoming Scatter-op operations (block 404). If identity conditions are present, the operation result value will be the identity element for a given operation, and FIFO Op Scheduler 250 is able to immediately treat the operation as satisfied because it has no effect on the results (block 406). As an example, consider an atomic_max( ) operation, which performs an atomic comparison of data to the contents of a location in memory, writes the maximum value into the location, and returns the original contents of the location from before the comparison occurred. If the value for this operation is the minimum value possible for the value's given precision (e.g., −128 for a signed 8$b$ value) the max operation will always return the value residing at the target physical address. This is because either the value is exactly equal to the MIN_VALUE or is greater than the MIN_VALUE. Recognizing such identity elements allows memory controller 200 to avoid allocating any entries (or updating existing entries) for such Scatter-op requests in the MCQ, write buffer, or read buffer, and often to avoid reading the value at the target physical address from DRAM. If identity conditions are not present (block 404), the process continues normal handling of the new Scatter-op request (block 408).

Figure 5:
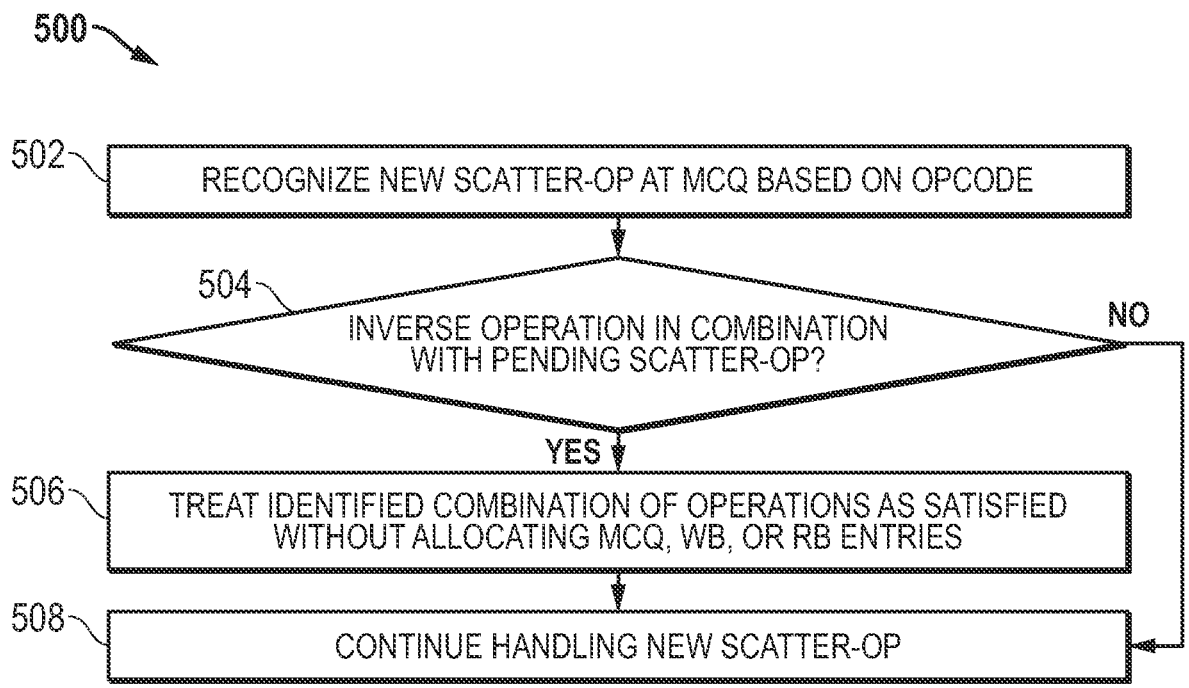
FIG. 5 shows a flowchart of a process for handling a combination of remote operations that result in an inverse operation according to some embodiments.

FIG. 5 shows a flowchart 500 of a process for handling a combination of remote operations that result in an inverse operation according to some embodiments. In some embodiments, memory controller 200 is also able to identify cases where inverse values would apply to a particular physical address. The process begins with a new Scatter-op arriving at MCQ 220 is recognized by its Opcode (block 502). The process checks if other Scatter-op commands are pending which, when combined with the new Scatter-op, have Opcodes and operand values that would result in inverse operations (block 504). If an operation is applied to inverses, the result becomes the identity, and the process described above with respect to identity elements is followed to avoid carrying out the operation fully, with the identified combination of operations being treated as satisfied (block 506). For example, memory controller 200 detects that an atomic_add operation will be applied with a value of −2 (or atomic_sub with 2), and then also detects that an atomic_add with a value of 2 will be applied, it is able to treat the result of applying these operations as the identity (in any order because the operations have commutativity and associativity), which ultimately has no effect on the final results. This process is able to eliminate the two detected Scatter-op requests for the same data element from accumulating in the MCQ/write buffer entries as part of a MSR operation. If no combination of Scatter-ops is identified at to result in an inverse operation (block 504), the process continues handling the new Scatter-op normally (block 508).

Memory controller 200 may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, while Scatter-op requests are handled by FIFO Op Scheduler 250, in other embodiments FIFO scheduling may not be used. Moreover, different techniques and circuits can be used to detect the conditions responsive to which the retention low power state is entered.

Accordingly, it is intended by the appended claims to cover all modifications of the disclosed embodiments that fall within the scope of the disclosed embodiments.

What is claimed is:

1. A memory controller comprising:
   a vector arithmetic logic unit (VALU) for performing scattered atomic memory operations on arrays of data elements; and
   an atomic memory operation scheduler for:
   scheduling atomic memory operations at the VALU;
   identifying a plurality of scattered atomic memory operations with commutative and associative properties, the plurality of scattered atomic memory operations for operating on at least one element of an array of data elements associated with an address; and
   commanding the VALU to perform the plurality of scattered atomic memory operations.

2. The memory controller of claim 1, further comprising:
a command queue that holds memory access commands and respective associated addresses; and
an arbiter that picks memory access commands from the command queue for dispatch to a random-access memory (RAM),
wherein identifying each of the plurality of scattered atomic memory operations is based on one of: a physical address, and a byte-aligned physical address.

3. The memory controller of claim 2, wherein:
the memory controller further comprises a read buffer coupled to the VALU and a write buffer coupled to the VALU; and
the read buffer includes a reference counter for each of multiple read buffer entries indicating a number of scattered atomic memory operations pending at the memory controller for the physical address of a respective read buffer entry.

4. The memory controller of claim 3, wherein, following a scattered atomic memory operation by the VALU, the atomic memory operation scheduler is operable to:
responsive to a reference count at a read buffer entry for the scattered atomic memory operation indicating one or more additional scattered atomic memory operations are pending, store a result of the scattered atomic memory operation in the read buffer entry; and
responsive to the reference count at the read buffer entry for the scattered atomic memory operation indicating no additional scattered atomic memory operation is pending, merge the result of the scattered atomic memory operation with other data values from the read buffer into the write buffer and schedule a write command to write the array of data elements to the RAM.

5. The memory controller of claim 1, wherein:
the memory controller further comprises a write buffer coupled to the VALU;
the write buffer serves as a coalescing data buffer for multiple scattered atomic memory operations; and
the write buffer includes an operation mask for each of multiple respective write buffer entries indicating selected bytes for performing a scattered atomic memory operation for which the respective write buffer entry holds operand data.

6. The memory controller of claim 1, wherein the VALU is operable to perform:
a first type of scattered atomic memory operation using two vector operands and comprising an N×M-bit operation with M being a precision of each data element and N a number of data elements; and
a second type of scattered atomic memory operation using one vector operand on N data elements to generate an M-bit result.

7. The memory controller of claim 1, wherein the atomic memory operation scheduler is operable to:
detect a selected scattered atomic memory operation command that would provide an identity result based on one or more of: an op code for the selected scattered atomic memory operation, and an operand value for the selected scattered atomic memory operation; and
provide an identity result for the selected scattered atomic memory operation command without performing the selected scattered atomic memory operation at the VALU.

8. The memory controller of claim 1, wherein the atomic memory operation scheduler is operable to:
detect a combination of scattered atomic memory operations commands that would provide an identity result based on one or more of: op codes for combination of scattered atomic memory operations commands, and operand values for the combination of scattered atomic memory operations commands indicating that an operation would be applied to inverses; and
provide an identity result for the combination of scattered atomic memory operations without performing relevant operations at the VALU.

9. A method for accelerating atomic memory operations at a memory controller, comprising:
identifying, from a command queue at the memory controller, a plurality of scattered atomic memory operations with commutative and associative properties and operating on at least one element of an array of data elements associated with an address;
retrieving a data array associated with the plurality of scattered atomic memory operations from a random-access memory and storing it in a read buffer entry;
commanding a VALU to perform a first one of the plurality of scattered atomic memory operations and storing a resulting data array in the read or write buffer entry; and
commanding the VALU to perform a subsequent one of the plurality of scattered atomic memory operations and storing a resulting data array in the read or write buffer entry.

10. The method of claim 9, wherein:
identifying each of the plurality of scattered atomic memory operations is based on one of: a physical address, and a byte-aligned physical address.

11. The method of claim 9, further comprising:
updating a reference counter for the read buffer entry to indicate a number of scattered atomic memory operation pending at the memory controller for the address associated with the plurality of scattered atomic memory operations.

12. The method of claim 11, further comprising, following a scattered atomic memory operation by the VALU:
responsive to a reference counter at a read buffer entry for the scattered atomic memory operation indicating an additional scattered atomic memory operation is pending, store a result in the read buffer entry; and
responsive to the reference counter at the read buffer entry for the scattered atomic memory operation indicating no additional scattered atomic memory operation is pending, merging a result of the scattered atomic memory operation with other data values from the read buffer into the write buffer and scheduling a write command to write the data array to a memory.

13. The method of claim 9, further comprising:
coalescing operand data for two or more of the plurality of scattered atomic memory operations in a write buffer entry;
updating an operation mask for the write buffer entry to indicate selected bytes for performing the plurality of scattered atomic memory operations; and
responsive to detecting one or more second operand values associated with one of the plurality of scattered atomic memory operations for one or more of the selected bytes, allocating a new write buffer entry to hold the second operand values.

14. The method of claim 9 wherein the VALU performs:
a first type of scattered atomic memory operation using two vector operands and comprising an N×M-bit operation with M being a precision of each data element and N a number of data elements; and a second type of scattered atomic memory operation using one vector operand on N data elements to generate an M-bit result.

15. The method of claim 9, further comprising:
detecting a selected scattered atomic memory operation command that would provide an identity result based on one or more of: an op code for the selected scattered atomic memory operation, and an operand value for the selected scattered atomic memory operation; and
providing an identity result for the selected scattered atomic memory operation command without performing the selected scattered atomic memory operation at the VALU.

16. A data processing system, comprising:
a data processor;
a random-access memory (RAM) coupled to the data processor; and
a memory controller comprising:
    a vector arithmetic logic unit (VALU) for performing scattered atomic memory operations; and
    an atomic memory operation scheduler for:
        scheduling atomic memory operations at the VALU;
        identifying a plurality of scattered atomic memory operations with commutative and associative properties, the plurality of scattered atomic memory operations for operating on at least one element of an array of data elements associated with an address; and
        commanding the VALU to perform the plurality of scattered atomic memory operations.

17. The data processing system of claim 16, further comprising:
a command queue that holds memory access commands and respective associated addresses;
an arbiter that picks memory access commands from the command queue for dispatch to a random-access memory (RAM),
wherein identifying each of the plurality of scattered atomic memory operations is based on one of: a physical address, and a byte-aligned physical address.

18. The data processing system of claim 17, wherein:
the memory controller further comprises a read buffer coupled to the VALU and a write buffer coupled to the VALU; and
the read buffer includes a reference counter for each of multiple read buffer entries indicating a number of scattered atomic memory operation pending at the memory controller for the physical address of a respective read buffer entry.

19. The data processing system of claim 18, wherein, following a scattered atomic memory operation by the VALU, the atomic memory operation scheduler is operable to:
responsive to a reference count at a read buffer entry for the scattered atomic memory operation indicating an additional scattered atomic memory operation is pending, store a result of scattered atomic memory operation in a read buffer entry; and
responsive to the reference count at the read buffer entry for the scattered atomic memory operation indicating no additional scattered atomic memory operation is pending, merge the result of the scattered atomic memory operation with other data values from the read buffer into the write buffer and schedule a write command to write the array of data elements to the RAM.

20. The data processing system of claim 17, wherein:
the memory controller further comprises a write buffer coupled to the VALU;
the write buffer serves as a coalescing data buffer for multiple scattered atomic memory operations; and
the write buffer includes an operation mask for each of multiple respective write buffer entries indicating selected bytes for performing a scattered atomic memory operation for which the respective write buffer entry holds operand data.

* * * * *